United States Patent [19]
Gatz

[11] Patent Number: 5,800,645
[45] Date of Patent: Sep. 1, 1998

[54] SYSTEM FOR ENCAPSULATION OF ELECTRIC WIRE SPLICES

[76] Inventor: John F. Gatz, 25405 Peekskill, Southfield, Mich. 48034

[21] Appl. No.: 618,783

[22] Filed: Mar. 20, 1996

[51] Int. Cl.⁶ .................................................. B65H 69/02
[52] U.S. Cl. ........................... 156/49; 29/868; 29/869; 118/423; 118/425; 118/426; 118/503; 156/509; 156/559; 156/578; 427/117; 427/434.6
[58] Field of Search ........................ 156/49, 509, 559, 156/578; 29/825, 868, 869; 118/423, 425, 426, 503; 427/117, 434.6

[56] References Cited

U.S. PATENT DOCUMENTS

| | | | |
|---|---|---|---|
| 391,815 | 10/1888 | Packard | 118/503 X |
| 1,466,339 | 8/1923 | Plante | 118/503 X |
| 2,044,077 | 6/1936 | Jones | 118/423 X |
| 2,116,430 | 5/1938 | Gordon | 118/423 X |
| 2,312,652 | 3/1943 | Komives et al. | 156/49 X |
| 2,414,498 | 1/1947 | Warner et al. | 156/49 X |
| 2,463,231 | 3/1949 | Wyatt | 156/49 |
| 2,768,105 | 10/1956 | Dittmore et al. | 154/2.22 |
| 3,121,563 | 2/1964 | Jansen | 118/503 X |
| 3,385,922 | 5/1968 | Rice | 174/84 |
| 3,403,063 | 9/1968 | Walker | 156/49 X |
| 3,467,561 | 9/1969 | Waride | 156/49 |
| 3,567,845 | 3/1971 | Bahder | 174/84 |
| 3,585,275 | 6/1971 | Gillemot et al. | 174/76 |
| 3,811,406 | 5/1974 | Tomlinson | 118/423 X |
| 4,095,011 | 6/1978 | Horsma et al. | 174/138 |
| 4,310,365 | 1/1982 | Elliott et al. | 156/300 X |
| 4,674,816 | 6/1987 | Frenznick et al. | 439/588 |
| 4,681,956 | 7/1987 | Settineri | 174/84 |
| 4,686,327 | 8/1987 | Debbaut et al. | 174/88 |
| 4,822,434 | 4/1989 | Sawaki et al. | 156/48 |
| 4,875,952 | 10/1989 | Mullin et al. | 156/48 |
| 4,880,962 | 11/1989 | Nolf et al. | 219/549 |

*Primary Examiner*—Francis J. Lorin
*Attorney, Agent, or Firm*—Young & Basile, P.C.

[57] ABSTRACT

A system including the method and apparatus for encapsulating electric wire splices wherein a plurality of electrical conductors in substantially aligned opposed relationship are electrically spliced and an encapsulation mass of thermoplastic dielectric material forms an insulative jacket over the splice. Encapsulation is produced by coating the spliced conductors with a liquified hot melt sealant, agitating and projecting the sealant toward the splice to fill small interstices between the conductors, removing the coated splice and conductors from the liquid sealant and drying the sealant into a dielectric jacket surrounding the splice.

10 Claims, 9 Drawing Sheets

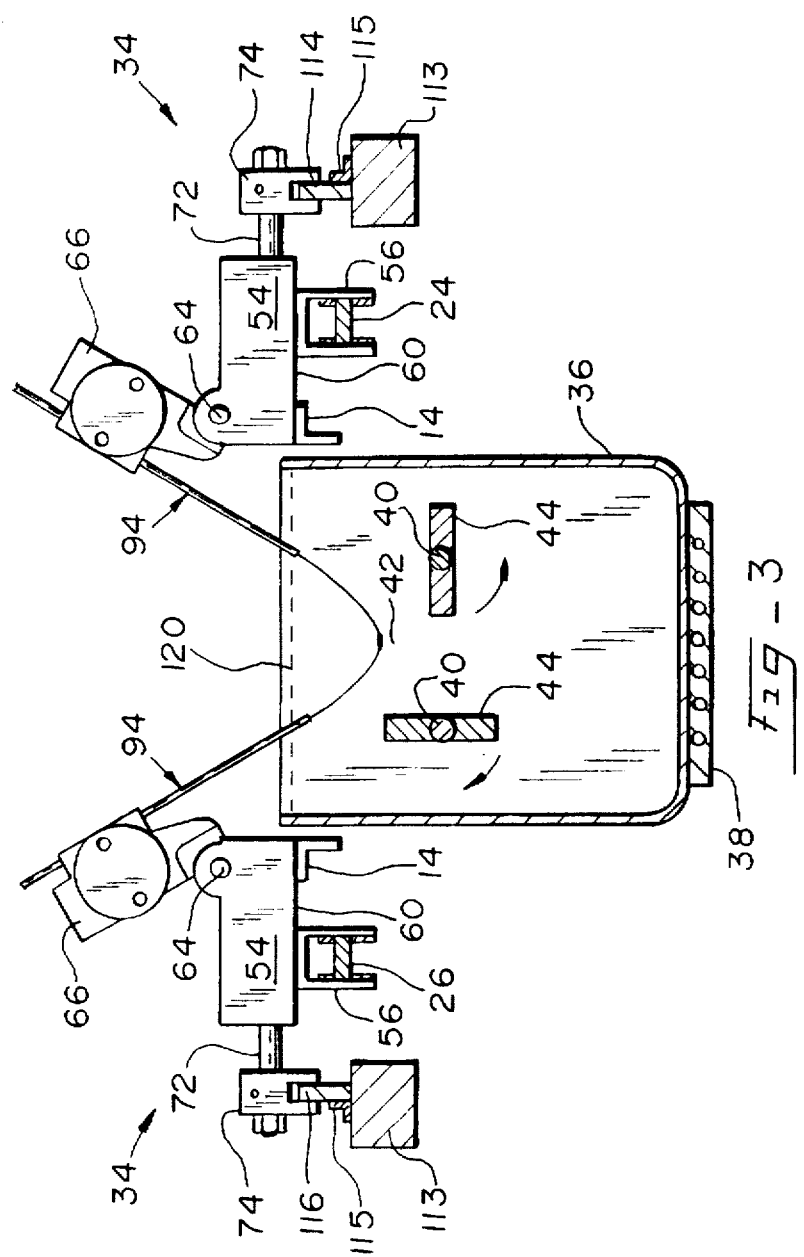

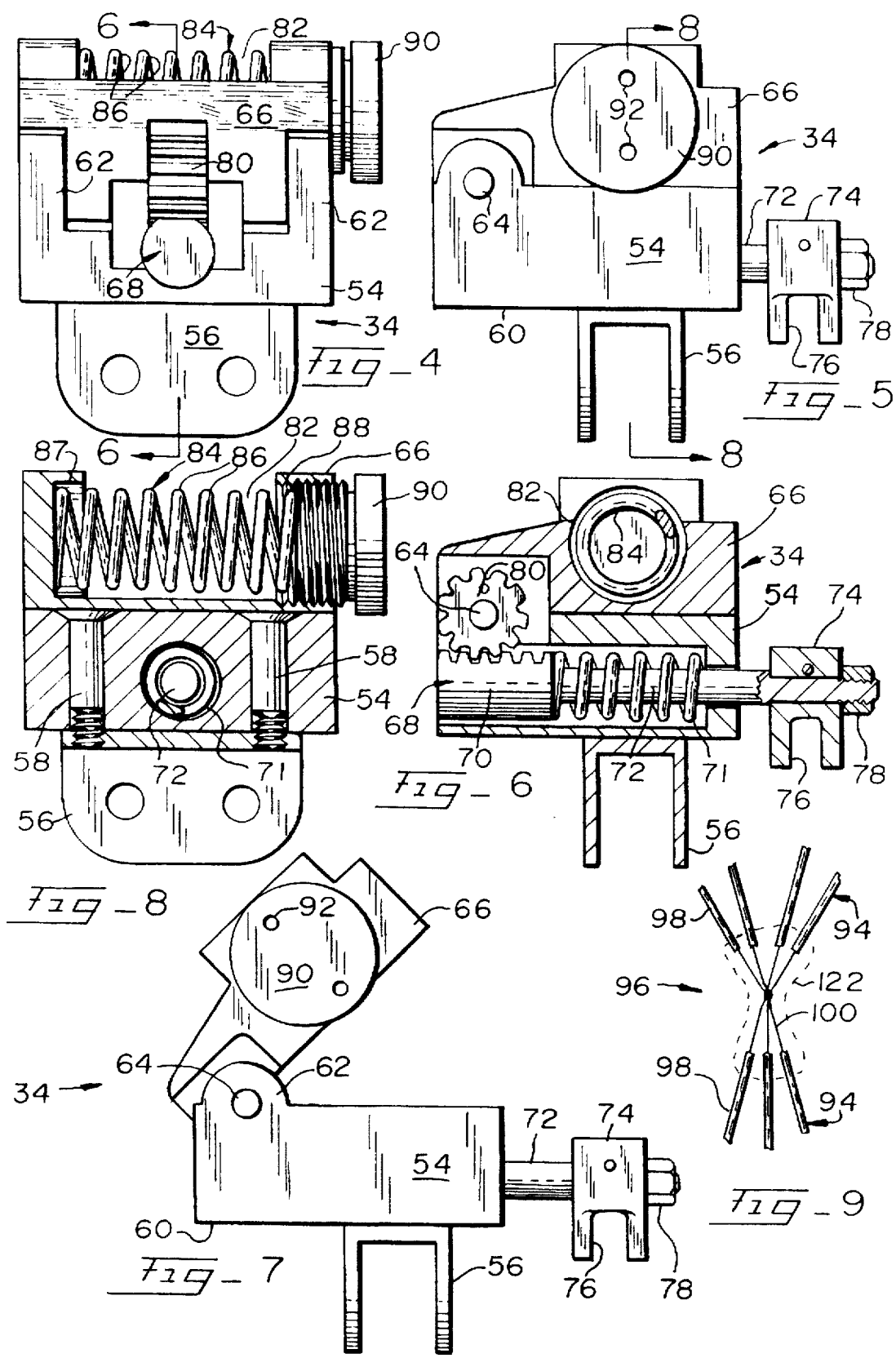

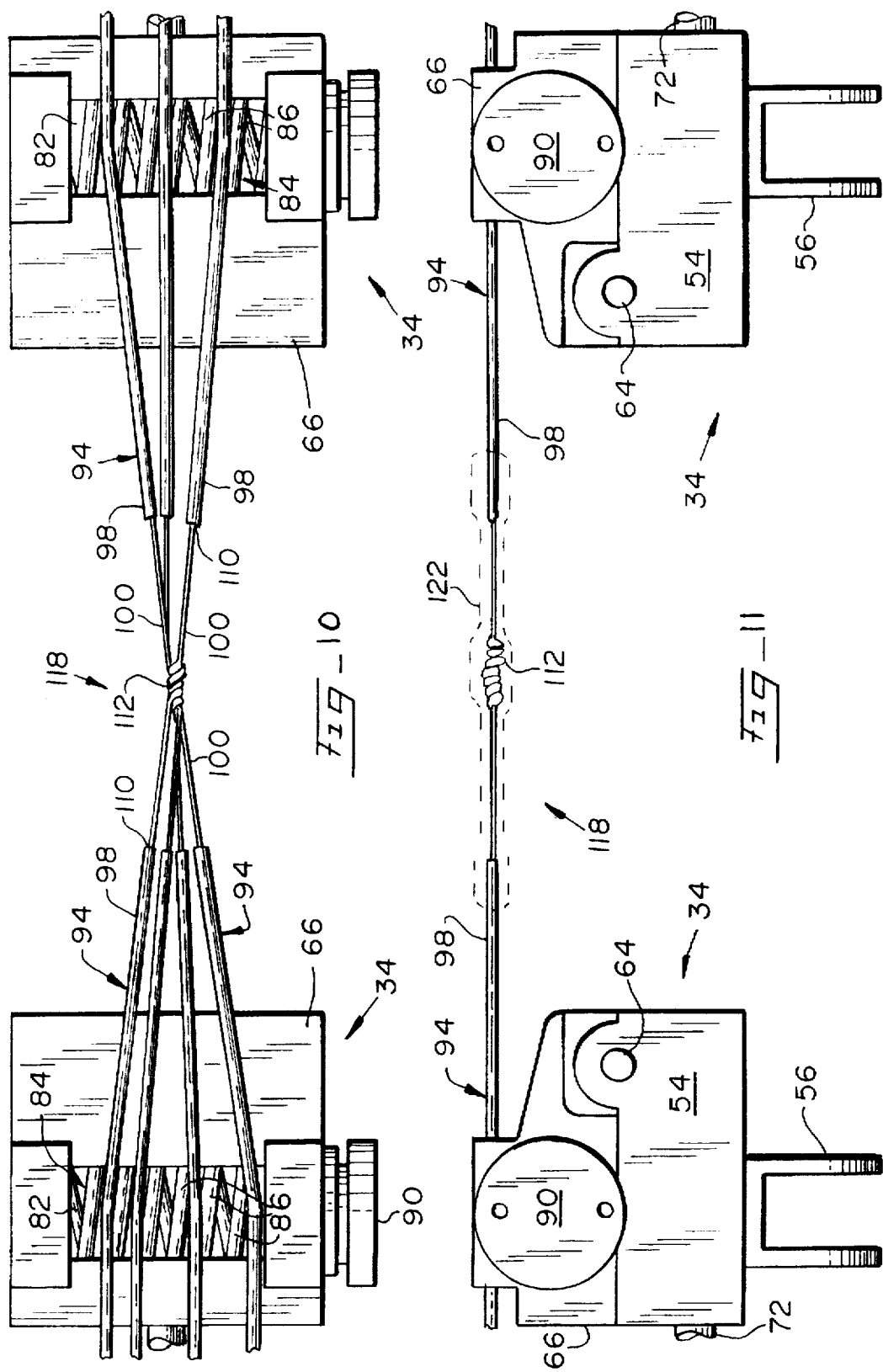

SYSTEM FOR ENCAPSULATION OF ELECTRIC WIRE SPLICES

BACKGROUND OF THE INVENTION

1. Field of the Invention

The invention pertains to the coating and encapsulation of the splices of an electric wire conductor harness wherein an electrical insulative jacket is formed about the splice by an automatic coating process.

2. Description of the Related Art

When interconnecting electric conductors, such as copper wire encased within a dielectric cover, a variety of splicing techniques are available, as well as techniques for electrically insulating and protecting the splice. For instance, a clamp may be used to interconnect the conductor wires and the clamp and adjacent conductor portions may be wound with electrician's insulative tape to render the splice dielectric and waterproof. Electrical conductors may also be connected by wire nuts which include conical threaded sockets in which the ends of the conductor wires are inserted and the nut tightened thereon. The nut itself, or its outer case, is formed of a dielectric material, and electrician's tape may be wound around the wire nut and associated conductor to seal the splice from the elements.

Where an attractive, efficient, finished splice is required a number of techniques have been developed wherein molds are used to encompass coaxially aligned conductors and a dielectric liquid material is inserted into the mold to encapsulate the splice and the adjacent conductor, and as the mold shapes the configuration of the mass or jacket of the dielectric sealant an attractive and finished splice is produced. Examples of the splicing of electric conductors utilizing molds are shown in U.S. Pat. Nos. 2,768,105; 4,095,044; 4,674,816; 4,686,327; 4,822,434 and 4,875,952.

Other patents disclose the formation of conductor splice seals and encapsulation using films, strips of dielectric material, wrappings, and kits for accomplishing splicing. Examples are found in the U.S. Pat. Nos. 3,385,922; 3,467,561; 3,585,275; 3,567,845; 4,681,986 and 4,880,962.

While splices formed in accord with the disclosures of the aforementioned patents can effectively insulate and protect electrical conductor splices, such splice encasing techniques are expensive, relatively slow to implement, and are not acceptable for very high production requirements such as the splicing of automobile wiring harness.

OBJECTS OF THE INVENTION

It is an object of the invention to provide a method and apparatus for economically encapsulating wire harness splices wherein the encapsulation may be achieved at a high rate of production, and yet an integral and dependable sealing of the splice is achieved.

Another object of the invention is to provide a method and apparatus for the high production encapsulation of automobile wiring harness wherein the splice encapsulation is produced by coating the splice with a hot melt dielectric thermoplastic sealant, and the procedure provides an integral mass jacket about the conductor splice capable of successfully withstanding the vibrations, temperatures and rigors of automotive use.

Yet another object of the invention is to provide a method and apparatus for coating the splices of a plurality of conductors wherein the splice is exposed to a hot thermoplastic sealant and the sealant is agitated and projected in such a manner as to penetrate small interstices at the splice to form a void-free encapsulation mass.

Yet another object of the invention is to provide apparatus for automatically encapsulating the splice of a plurality of electric wire harness conductors wherein the conductors are automatically bent into a U-configuration with the splice located at the lowermost portion of the configuration, dipped into a hot liquified dielectric sealant and then automatically removed from the sealant, the sealant mass about the splice being permitted to dry and cure.

A further object of the invention is to provide apparatus for automatically encapsulating the splice of a plurality of electric wire harness conductors wherein the conductors are automatically bent into a U-configuration during dipping of the splice into the encapsulation material, and after the splice is removed from the encapsulation material the conductors are partially rotated about an axis generally parallel to the normal length of the conductors to an inverted position to improve the characteristics of the encapsulation mass, wrap any material drippings about the mass prior to solidification and facilitate rapid cooling and solidification.

An additional object of the invention is to provide apparatus for automatically encapsulating the splice of a plurality of electric wire harness conductors wherein the conductors are exposed to an upwardly flowing molten thermoplastic sealant capable of penetrating the small interstices at the splice to form a void-free encapsulation mass, and it is not necessary to bend the conductors prior to exposure to the sealant.

SUMMARY OF THE INVENTION

In the practice of the invention the apparatus for automatically encapsulating a wire harness splice includes a frame upon which a reservoir is mounted. The reservoir is of an elongated configuration, open at the top, and is provided with an electrical heater wherein a dielectric thermoplastic hot melt sealant may be located within the reservoir in a liquid form.

A pair of chain driven conveyors are mounted upon the frame on opposite sides of the reservoir and having an operative direction of movement parallel to the reservoir length. Each of the conveyors supports a plurality of conductor holders each capable of holding the conductors of a wire harness, such as commonly employed with automobiles, or the conveyors may constitute an endless coil spring. The conductor holders of the conveyors of one embodiment are utilized in transversely aligned pairs whereby the holders on one conveyor support the conductors on one side of the splice while the holder on the other conveyor supports the conductors on the opposite side of the splice. As later described, the holders are capable of each handling a plurality of conductors, and, generally speaking, the conductors of the harness electrically connected at the splice extend in opposite directions from the splice. Usually, several conductors extend in each direction from the splice, and the holders support each of the conductors individually, and slightly separated from each other.

The conductor pairs are located within the conductor holders at one end of the frame, and as the conductor holders move across the top of the apparatus above the sealant reservoir the conductor holders incline to the horizontal and move toward each other. This conductor holder movement causes the conductor span extending over the reservoir to deform and bow into a U-shaped configuration dipping the central portion of the span into the reservoir and the dielectric sealant contained therein. The splice is located at the lowermost portion of the conductor U-configuration and is fully immersed into the sealant.

The immersed conductors and splice move along the length of the reservoir due to the conveyor movement, and the reservoir includes rotating paddles which agitate and project the liquified sealant toward the splice. This projection of the sealant toward the splice forces the sealant into the small interstices between adjacent conductors near the splice, and the agitating paddles insure that a dense, void-free, encapsulation of the splice and the conductors adjacent the splice is achieved.

After immersion in the reservoir, the conductor holders resume their initial orientation withdrawing the conductor splice and surrounding conductor regions from the sealant, and the wire harness may be removed from the conductor holders and the harness is permitted to dry wherein an encapsulation mass of the sealant is formed about the splice and the associated conductor, and the insulative jacket formed on the conductor at the splice will be of a uniform cavity-free density and protect the splice from shorting, electrical loss, corrosion, and exposure to the atmosphere.

Wire harnesses vary considerably as to the number of conductors which may be electrically spliced, and a feature of the invention lies in the construction of the conductor holders which permit from one to eight or nine conductors to be supported during an encapsulation procedure. The versatility of the apparatus with respect to the number of conductors which may be accommodated is due to the use of a compression spring with the conductor holders to serve as the apparatus for holding the conductors during dipping. Each of the conductor holders includes an upper pivotal portion which pivots to lower the splice into the reservoir, and each pivotal portion includes an adjustable compression spring. The coils of the spring are laterally accessible, and the length of the spring is selectively adjustable so that the distance separating adjacent spring coils may be regulated as desired. The distance between adjacent spring coils is adjusted to be slightly less than the outer diameter of the conductors whereby the lateral insertion of the conductor insulative coatings between the adjacent spring coils causes a flexing of the spring permitting the spring coils to firmly frictionally engage the associated conductor. If a higher friction engagement between the conductor and a spring is desired, the same is easily achieved by adjusting the spring length through the threaded head associated with each spring which determines the length thereof.

The movement of the conductor holders to pivot the conductors into and from the sealant reservoir is achieved by stationary cam rails fixed to the frame. Each of the conductor holders includes an upper pivoted portion in which the conductor holding spring is located, and the lower portion of each conductor holder includes a longitudinally adjustable rack engaging a gear which determines the pivotal position of the conductor holder upper portion. The longitudinal position of the rack is determined by a cam follower which engages the cam rail, and hence, the pivotal orientation of the upper portion of the conductor holder, and the orientation of the conductor span between conductor holders, will be determined by the configuration of the cam rails associated with each conveyor and the conductor holders mounted thereon.

In an embodiment of the invention, after dipping of the conductors and splice within the encapsulation material, and withdrawing the conductors from the material, the conductors are partially rotated about 180° in a direction about an axis generally parallel to the length of the conductors. This partial rotation aids in the flow of the still molten material into the interstices of the splice, "winds" strings or dripping of material about the encapsulation mass resulting in an efficient, air tight and string or drip free encapsulation mass and augments cooling and hardening of the splice.

The splice "dipping" apparatus of the invention is readily suitable for automatic loading and unloading procedures and apparatus, and the inventive apparatus is capable of producing a high quality wire harness splice providing uniform results under high production capabilities.

In another embodiment of the invention, the conveyors each consist of an endless coil spring which is supported upon holders mounted upon a roller chain. In this embodiment, it is not necessary for the loader to insert the conductors on aligned holders, but rather the use of the endless spring conveyor permits the conductors to be quickly inserted between the coils of the spring for holding the conductors therein whereby the conductors will bridge the two endless chain conveyors, and the conductor splice will move over the thermoplastic liquid sealant reservoir.

In this embodiment, rather than dipping the conductors into the liquid sealant, the sealant is pumped upwardly so as to produce an upward flow through which the splice passes. The movement of the flowing sealant will penetrate the splice interstices. As the splice, and its associated conductors, do not need to be flexed during the coating operation, excellent sealing is achieved, and the structure of this embodiment lends itself to a particularly high rate of production.

BRIEF DESCRIPTION OF THE DRAWINGS

The aforementioned objects and advantages of the method and apparatus of the invention will be appreciated from the following description and accompanying drawings wherein:

FIG. 3 is an enlarged elevational sectional transverse sectional view through the reservoir as taken along Section 3—3 of FIG. 1, FIG. 4 is an inner end elevational view of the conductor holder of FIG. 5 as taken from the left of FIG. 5, FIG. 5 is a side elevational view of the conductor holder of FIG. 4 as taken from the right of FIG. 4, FIG. 6 is an elevational sectional view taken through the conductor holder of FIG. 4 along Section 6—6 thereof, FIG. 7 is a side elevational view similar to FIG. 5 illustrating the upper portion of the conductor holder as pivoted upwardly during the conductor immersion phase, FIG. 8 is a sectional view through the conductor holder as taken along Section 8—8 of FIG. 5, FIG. 9 is a detail view illustrating the relationship of the conductors of a typical harness splice, the separation of the conductors being exaggerated for purpose of illustration, FIG. 10 is an enlarged detail plan view illustrating the relationship of the conductors forming a splice as loaded within the conductor holders, and prior to immersion into the sealant reservoir, FIG. 11 is a generally schematic side elevational view of FIG. 10 as taken from the bottom of FIG. 10.

DESCRIPTION OF THE PREFERRED EMBODIMENTS

Figure 2:
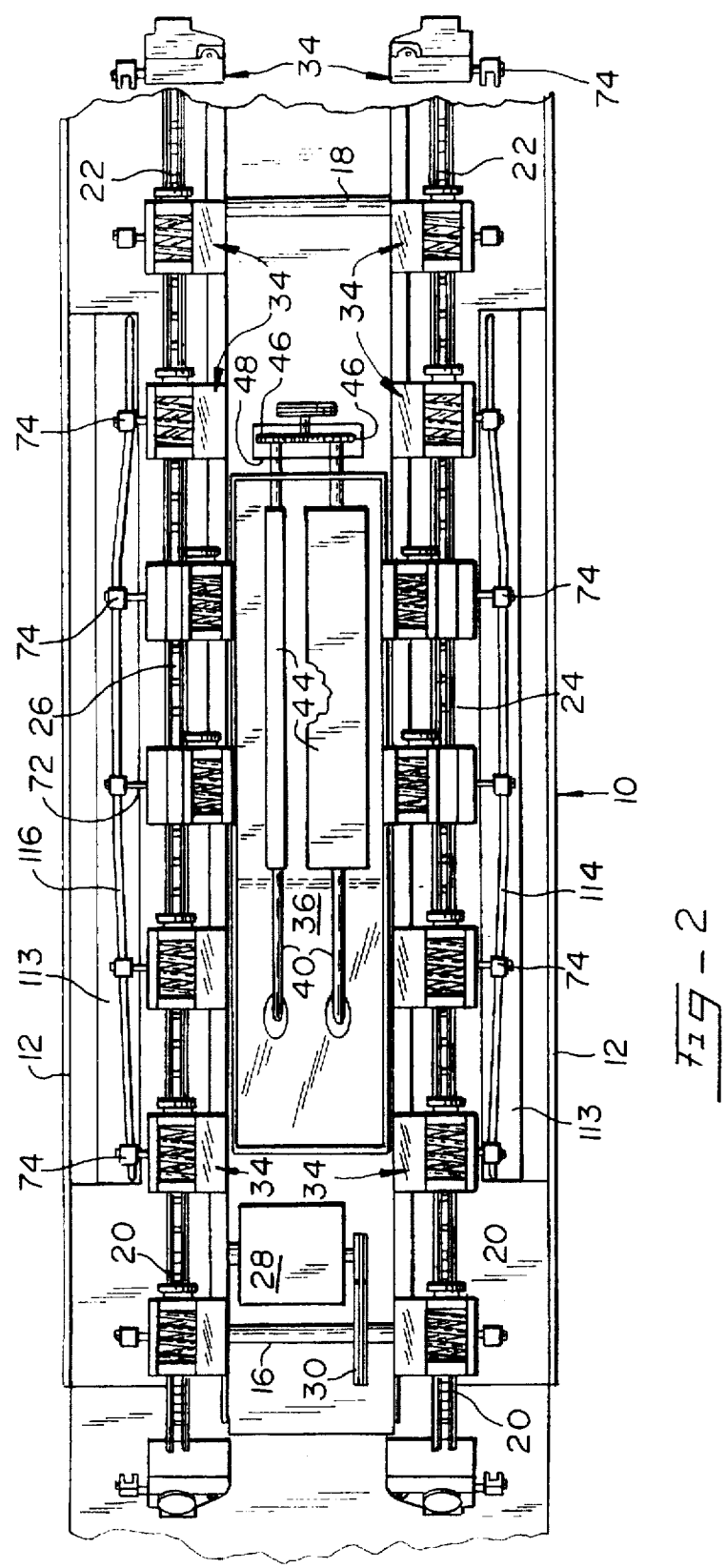
FIG. 2 is a top plan view of the apparatus of FIG. 1, the sealant reservoir being empty so as to illustrate the agitation paddles therein.

The apparatus in accord with the invention is mounted upon a frame generally indicated at 10 and the frame includes vertical wall portions 12, FIG. 2, and the frame also includes horizontally disposed angles 14 at its upper region, FIG. 3. A pair of shafts 16 and 18 extend transversely across the frame 10 and are mounted in bearings, not shown, wherein each shaft supports a pair of spaced chain sprockets. Sprockets 20 are mounted upon shaft 16, while sprockets 22 are mounted upon shaft 18. The conveyor chain 24 extends between the aligned sprockets 20 and 22 located upon one side of the frame 10, while the conveyor chain 26 is located upon the sprockets 20 and 22 on the opposite side of the frame, FIG. 2. Conventional bearing adjustment structure, not shown, may be associated with one of the shafts for adjusting the tension in the chains 24 and 26.

Figure 1:
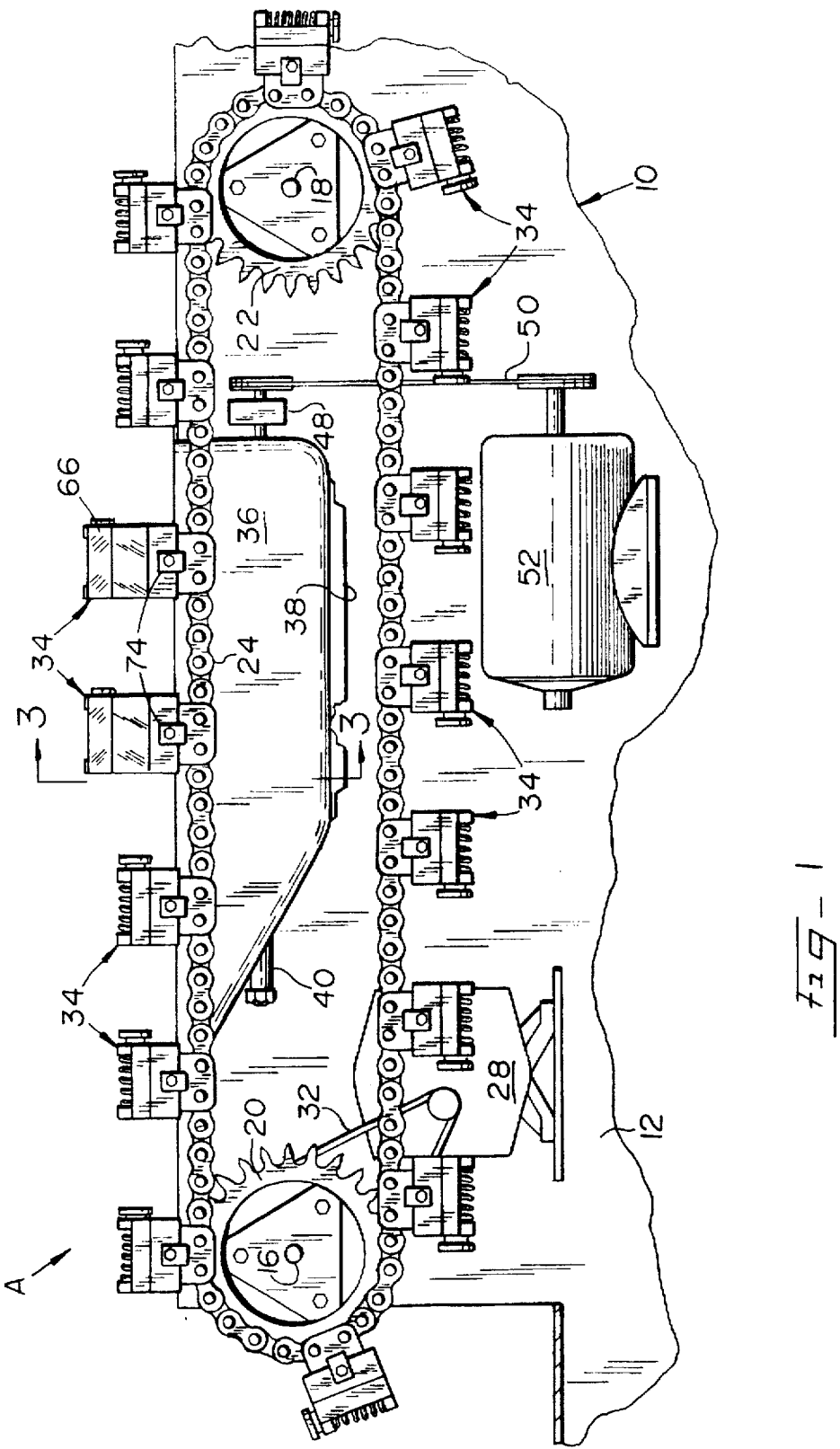
FIG. 1 is a side elevational view of splice encapsulation apparatus in accord with the inventive concepts, the cam rail not being illustrated for purpose of clarity of viewing.

The sprockets 20 are rotated by an electric drive motor 28, FIG. 1, which rotates the shaft 16 through a drive sprocket or sheave 30 mounted on shaft 16 by means of the motor driven chain or belt 32. Accordingly, it will be appreciated that energizing of the motor 28 rotates the sprockets 20 causing the drive chains 24 and 26 to transverse along the length of the frame 10. As viewed in FIG. 1, the upper portion of the chain 24 moves to the right.

A plurality of conductor holders are mounted upon each of the conveyor chains 24 and 26. The conductor holders are generally indicated at 34, are of right and left hand configuration, and the details thereof will be later described. The conductor holders 34 are substantially evenly spaced along the associated conveyor chain and are transversely aligned in pairs as is apparent in FIG. 2.

With reference to FIG. 2, it will be noted that a reservoir 36 is located on the frame 10 between the conveyor chains 24 and 26 and between the frame angle irons 14, FIG. 3. The reservoir 36 is of the configuration as will be apparent from FIGS. 1–3, and the reservoir is open at the top so as to provide full access into the reservoir during the dipping of the conductors to coat the splice.

As shown in FIG. 1, an electric heating element 38 is located at the bottom of the reservoir so as to heat the reservoir contents, and melt the dielectric hot melt splice sealant located therein.

A pair of shafts 40 longitudinally extend through the reservoir 36 and are rotatably supported by conventional bearings and seals. The shafts 40 are located upon opposite sides of the central region of the reservoir as indicated at 42 in FIG. 3, and an elongated flat paddle 44 is mounted on each shaft extending along the majority of the shaft length. As will be appreciated from FIGS. 2 and 3, the paddles 44 located upon the shafts 40 are oriented at 90° to each other. At their rear outer ends, the shafts 40 are provided with gears 46 driven through a transmission 48 powered by the chain or belt 50 connected to the electric motor 52, FIG. 1. The gears and transmission 48 cause the shafts 40 to rotate in opposite directions and the paddles rotate as indicated by the arrows in FIG. 3. This direction of rotation will impel and project the liquified sealant within the reservoir 36 engaged by the upper portion of the paddles toward the upper central region 42 of the reservoir for a purpose later described.

The construction of the conductor holders 34 is best appreciated from FIGS. 4–8. Each of the conductor holders includes a lower base portion 54 having an inverted U-shaped saddle 56 mounted thereon by bolts 58 and extending therebelow which is pinned to the associated conveyor chain 24 or 26, FIG. 1. The holders 34 are made in right and left hand versions depending upon which chain they are connected to, but the construction of each is identical. Also, each base portion 54 includes a guide surface 60 adapted to engage and slide upon the adjacent frame angle 14 as will be apparent from FIG. 3.

With reference to FIG. 4, the base portion 54 includes a pair of upstanding ears 62 through which the pivot pin 64 extends. The pivot pin 64 supports the conductor holder upper portion 66 whereby the upper portion 66 may pivot between the position shown in FIGS. 4 and 5, and the position shown in FIGS. 3 and 7.

Pivoting of the upper portion 66 to the base portion 54 is produced by a longitudinally displaceable rack 68 slidably mounted within the portion 54, FIG. 6. The rack includes the toothed portion 70, and a compression spring 71 biases the rack toward the left, FIG. 6. The rack stem 72 extends from the portion 70 and at its outer end is provided with the cam follower 74 having the cam rail receiving notch 76 formed in the lower portion thereof. A nut 78 located upon the outer end of the stem 72 maintains the cam follower upon the rack stem.

A gear 80, having teeth meshing with the teeth of the rack portion 70, coaxially circumscribes the pivot pin 64, and the gear is fixed to the upper portion 66. Accordingly, as the rack 68 is longitudinally translated the gear 80 is oscillated, and pivoting of the portion 66 occurs. Movement of the rack to the right, FIG. 6, will pivot the portion 66 in a counter-clockwise direction about the pivot 64 as shown in FIG. 7.

The apparatus for attaching the wiring harness conductors to the conductor holders 34 is mounted upon the upper portion 66. The portion 66 includes a laterally accessible recess 82, FIG. 8, which is open at its upper central region and in which is received the spring 84 having adjacent coils 86. One end of spring 84 is received within recess socket 87 and the portion 66 includes a threaded bore 88 in which the threaded spring adjustment head 90 is received, which is adjustably rotated by a spanner wrench engaging spanner holes 92, FIG. 5, and the other end of the spring 84 is received within bore 88. Thus, as the head 90 is rotated and axially displaced within the threaded bore 88 the length of the spring 84 may be regulated, and the spacing between adjacent coils 86 will be varied.

As will be appreciated from FIG. 10, the conductors 94 of the wire harness 96 are laterally received between the spring coils 86, and the head 90 is adjusted so that the normal spacing between the adjacent coils 86 will be slightly less than the outer diameter of the conductor insulation whereby a firm frictional engagement between the conductors and the spring coils will be achieved upon the conductors being laterally inserted between the spring coils.

A typical orientation of the conductors 94 of an automotive wire harness 96 as spliced and in accord with the invention is shown in FIGS. 9–11. The conductors 94 are of a typical construction having an outer dielectric jacket 98 or covering formed of synthetic plastic or the like. Internally, the conductor will have an electrically conductive wire 100 such as of copper or aluminum. The conductor jacket will be trimmed at 110 adjacent the splice to expose the wires 100, and the wires will be connected together at the splice 112, and soldered or otherwise fused in an electrical conducting relationship.

It is of significance to note that the number of conductors 94 associated with a common splice 112 may vary. In FIGS. 9 and 10, four conductors 94 are illustrated as being located on one side of the splice 112, while three conductors are located upon the other side of the splice. However, it is to be understood that the inventive concepts can be utilized wherein single conductors are located upon opposite sides of the splice and greater or fewer numbers of conductors may be spliced and encapsulated than those illustrated.

With reference to FIGS. 2 and 3, it will be appreciated that cam rails 114 and 116 are mounted upon the frame 10 upon frame elements 113 by brackets 115, FIG. 3, adjacent the conveyor chains 24 and 26, respectively. The cam rails are each of an elongated bowed configuration having a plan configuration as will be appreciated from FIG. 2. The cam rails 114 and 116 are adapted to be received within the cam follower notches 76 when the conductor holders 34 approach the reservoir 36, and as the distance of the cam rails from the adjacent chain varies along the length of the reservoir, FIG. 2, it will be appreciated that the engagement of the cam followers 74 upon the cam rails 114 and 116 will translate the racks 68 within the conductor holders 34 as the conductor holders are translated the length of the reservoir. At those locations where the cam rails 114 and 116 are the greatest distance from the reservoir 36, the conductor holder portions 66 will be tilted upwardly as shown in FIGS. 3 and 7, and the portions 66 will return to the horizontal or neutral position of FIGS. 5 and 11 where the cam rails are closest to the reservoir.

The reservoir 36 is filled with a hot melt dielectric thermoplastic adhesive sealant which is maintained in a liquid state by the heating element 38. The sealant is preferably a block co-polymer rubber/hydrocarbon resin based material which is compounded to have a relatively low viscosity when heated in the reservoir 36 and which has excellent adhesion characteristics to the conductors and exposed wires, and when dried will resist deterioration from exposure to the oils, fuels and temperatures encountered in an automotive environment. Upon drying, the sealant remains pliable and flexible, and is impervious to moisture.

In operation, the wire harness 96 is loaded upon the conductor holders 34 at the position A of the conductor holders as indicated in FIG. 1. Such loading of the conductor holders may be facilitated by the use of guides and loading surfaces, not shown, and as the movement of the chains 24 and 26 is relatively slow, the wire harness may be loaded upon a pair of holders 34 as shown in FIG. 10. Loading of the conductors upon the conductor holders merely requires the lateral insertion of the three conductors 94 at the right of the splice 112, FIG. 10, in the right spring 84, while the four opposed conductors 94 at the left of the splice 112 are inserted between the coils 86 of the spring of the aligned left conductor holder 34. In this manner, the conductors 94 form a span 118 between the associated holders 94 which bridges the holders and will extend across the reservoir 36.

The loaded conductor holders 34 move toward the reservoir 36, and the holder cam followers 74 will align with and receive the end of the cam rails 114 and 116 as appreciated from FIG. 2. As the conductor holders 34 move over the reservoir 36 the outwardly bowed central region of the cam rails 114 and 116 will longitudinally displace the stems 72 and racks 68 away from the reservoir causing the holder portions 66 to pivot upwardly as in FIGS. 3 and 7 as the gears 80 rotate about the axis of pivot pin 64 wherein the holders 34 will tilt toward each other and will bend the wire harness span 118 downwardly into a generally U-configuration into the reservoir, as shown in FIG. 3. This deflection of the span 118 downwardly immerses the splice 112 and the exposed wires 100 adjacent the splice, and the adjacent portions of the conductor insulation jacket 98, into the dielectric hot melt liquid sealant within the reservoir below the sealant surface 120. The liquid sealant will adhere to the splice, wires and conductors forming a mass on the conductors, represented by phantom lines 122 in FIGS. 9 and 11, defining a jacket which will protect the splice and its associated wires from the atmosphere, and electrically insulate the splice region.

As will be appreciated from FIG. 10, the coils 86 of the springs 84 will slightly separate the conductors 94 associated therewith, and V-shaped interstices between adjacent conductor wires 100 exist near the splice 112. It is highly desirable that the dielectric sealant be received within such interstices to prevent moisture from entering, and cavities in the sealant at such interstices are to be avoided. The entering of the dielectric sealant into the V-shaped interstices between adjacent conductors 94 is facilitated by the agitation and projection of the sealant as produced by the rotating paddles 44. As the upper portion of the paddles 44, FIG. 3, forcibly moves the sealant in the reservoir in the direction toward the splice 112 the sealant will enter between adjacent conductors and substantially eliminate cavities and voids which might otherwise occur between the conductors.

As the loaded conductor holders 94 continue to move to the right, FIGS. 1 and 2, the cam rails 114 and 116 are so configured as to displace the racks 68 toward the reservoir and pivot the holder portions 66 horizontally toward the position of FIGS. 5 and 11. Such movement of the holder portions 66 will raise the span 118 from the reservoir 36, as shown in FIG. 11, and the encapsulation sealant mass 122 adheres to the previously immersed portion of the wire harness. Upon drying, the sealant mass 122 forms a tough, pliable, impervious flexible jacket which does not significantly affect the flexibility of the wire harness 96.

At the right end of the conveyor chains 24 and 26, FIGS. 1 and 2, the conductors 94 are readily laterally pulled or "stripped" from their associated holder spring 84, and the conductor holders 34 will be transported around the sprocket 22 to the return portion of the associated chain. During such return, the compression spring 71 will maintain the portion 66 upon the base portion 54 in the neutral position shown in FIG. 5 which will permit the conductor holders to be readily loaded at position A, and align the cam follower 74 with the end of the adjacent cam rail 114 or 116 during the next immersion cycle.

Figure 12:
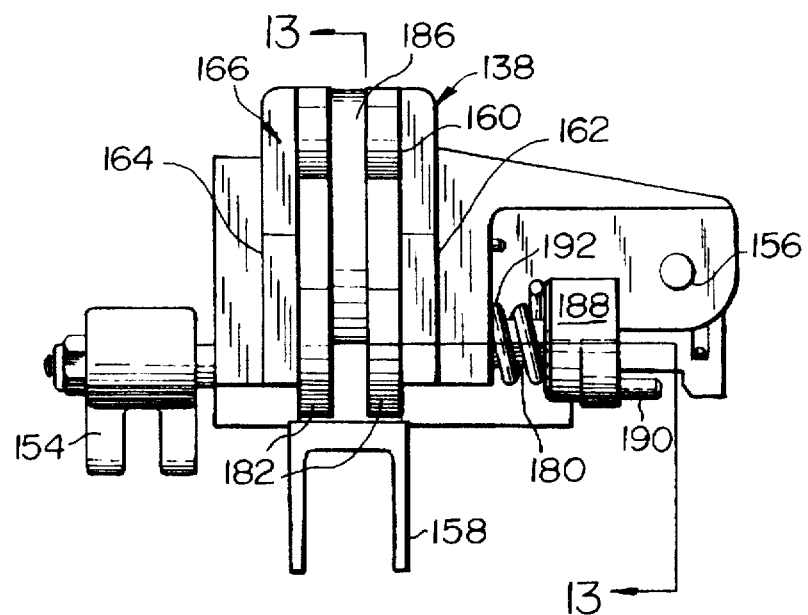
FIG. 12 is a front elevational view of a variation in a conductor holder wherein the springs holding the conductors are mounted within a pivotally supported retainer for rotating the conductors after dipping.
Figure 13:
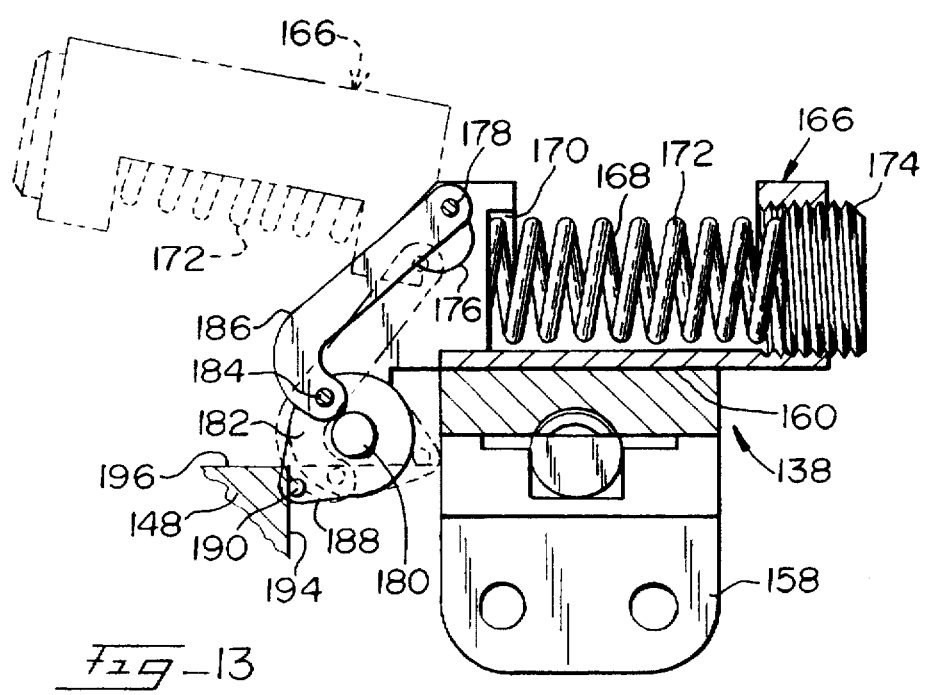
FIG. 13 is an elevational sectional view of the conductor holder embodiment of FIG. 12 as taken along Section 13—13, the normal position of the spring retainer being shown in full lines, and the spring retainer and operating linkage being shown in dotted lines when pivoted to its maximum inverted position.
Figure 14:
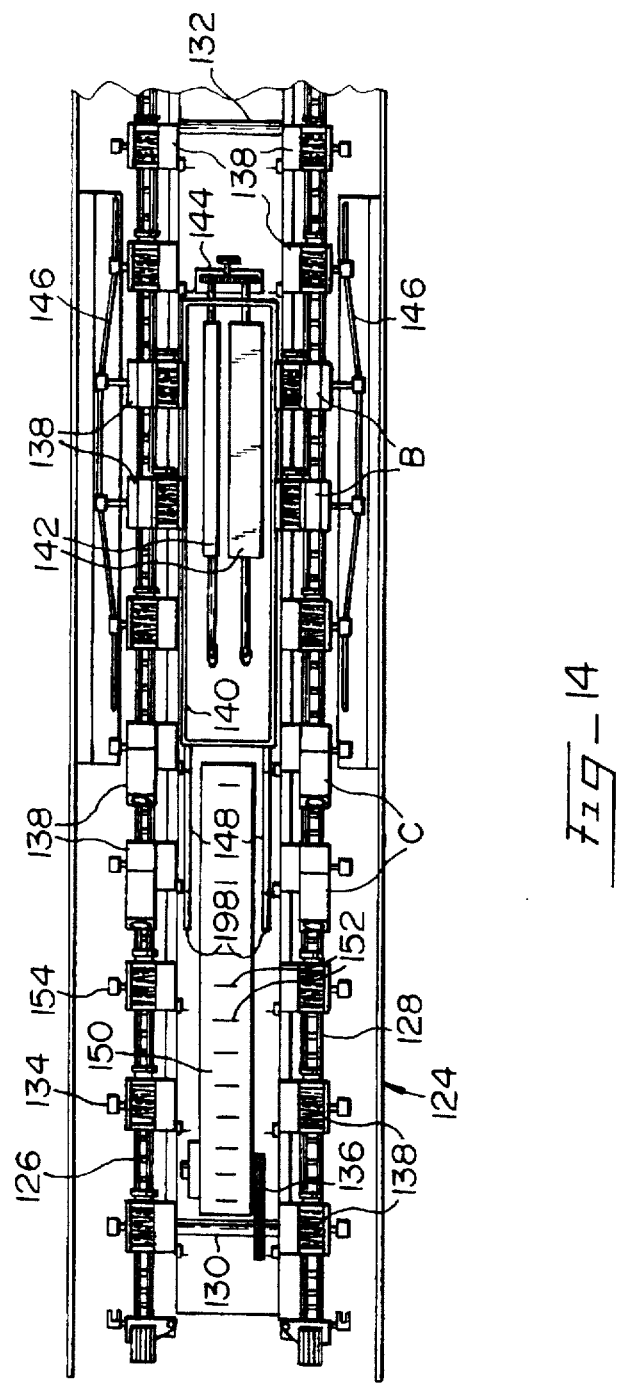
FIG. 14 is a top plan view of splice encapsulation apparatus utilizing the conductor holder embodiment shown in FIGS. 12 and 13.

In FIGS. 12–14, a variation in apparatus for encapsulating electrical insulating conductors is shown wherein, after the conductors splice is immersed into the encapsulation material and withdrawn therefrom the conductors are then rotated approximately 180° to an inverted position and this rotation of the conductors and encapsulation mass aids in the distribution of the encapsulation material within the interstices of the splice, improves the appearance of the splice as drippings or "strings" flowing from the encapsulation mass after withdrawal from the reservoir are wrapped about the encapsulation mass and absorbed therein producing a concise splice of uniform configuration and appearance, and enhances cooling of the splice mass.

In the embodiment of FIGS. 12–14 the apparatus includes a frame 124, FIG. 14, supporting a pair of spaced parallel conveyor chains 126 and 128 supported on sprockets, not shown, mounted on shafts 130 and 132 which are rotatably supported upon the frame 124. An electric motor 134 drives the shaft 130 through drive mechanism 136 to rotate the shaft and move the chains 126 and 128 and the conductor holders 138 the length of the frame 124 in a manner similar to that described above. As viewed in FIG. 14, the upper portion of the chains 126 and 128 moves to the left.

The frame 124 also includes an elongated reservoir 140 in which the encapsulation material is located and maintained in a molten state by heaters, not shown. Agitation of the encapsulation material within the reservoir 140 is accomplished by paddles 142 driven by motor 144 in a manner similar to that previously described.

The conductor holders 138 are evenly spaced along the chains 126 and 128 are tilted inwardly to immerse the splices of conductors held by the holders 138 by cam rails 146 and the conductor holders 138 are constructed in a manner similar to conductor holders 34 as described above to permit such tilting to immerse the splices of the conductors held within the spring coils of the holders.

Linear rails 148 are also mounted upon frame 124 inwardly of the conveyor chains for operating the conductor holder mechanism for inverting the conductors, as later described.

A cooling air conduit 150 is located centrally on the frame 124 behind the reservoir 140 and includes air slots 152 whereby cooling air may be directed upon the splice masses after they leave the reservoir to aid in the cooling and hardening of the encapsulation material.

As will be appreciated from FIG. 12, the conductor holders 138 each include a pivot pin 156 which is similar to pivot pin 64 permitting the conduit holders to tilt upwardly to immerse the conductor splices. Each of the conductor holders 138 is connected to the associated chain 126 or 128 by a saddle 158.

The conductor holders 138 differ from conductor holders 34 in that the holders 138 each include an elongated recess in their upper region extending parallel to the length of the associated chain. The recess 160 is defined by vertically disposed parallel spaced sides 162 and 164 defined upon a conductor holder, and an elongated spring retainer 166 is located within the recess 160 of each conductor holder 138. The retainers 166 are located between the sides 162 and 164 and include lateral sides 168 defining an elongated socket 170 in which the coil spring 172 is received. The upper portion of the socket 170 is open so that the upper portion of the spring coils is accessible for receiving the conductors therebetween as described above.

A head 174 is threaded into one end of the retainer 166 to vary the compression on the spring 172 and predetermine the spacing between adjacent spring coils.

Each retainer 166 is pivotally mounted upon the associated conduit holder 138 by a pivot 176 having an axis transverse to the length of the associated conveyor chain, and transverse to the direction of conductor holder movement. The pivot 176 permits the retainer 166 to tilt forwardly out of the recess 160 from the full line position shown in FIG. 13 to the dotted line position illustrated wherein approximately 180° rotation of the retainer 166 may occur.

As is apparent in FIG. 13, a crank pin 178 is centrally located at the front end of the retainer 166 and forms a part of the operating mechanism for the retainer as described below.

A shaft 180 is rotatably mounted in the forward end of the conductor holders 138 and extends parallel to the pivot pin 176. The shaft 180 has a pair of cylindrical rotors 182 mounted thereon in spaced relationship and a crank pin 184, FIG. 13, extends between the rotors 182. A curved link 186 connects the crank pin 184 to the crank pin 178 whereby rotation of the shaft 180, rotors 182 and crank pin 184 cause the link 186 to pivot the retainer 166 between the full line and dotted line positions shown in FIG. 13.

Rotation of the shaft 180 is controlled by the shaft head 188 located upon the inward end of the shaft 180. The head 180 includes an inwardly extending operating pin 190 which is offset with respect to the axis of rotation of shaft 180. The operating pin 190 is in alignment with the cam rails 148 mounted upon the frame 124.

A torsion spring 192, FIG. 12, is interposed between the shaft head 188 and the associated conductor holder 138 which biases the shaft 180 in a clockwise direction, FIG. 13, intending to maintain the retainer 166 within the conductor holder recess 160. In its normal condition as shown in the full lines of FIG. 13, the operating pin 190 will be located well below the axis of shaft 180 and in alignment with the end edge 194 of the cam rail 148.

As the operating pin 190 engages the cam rail end 194, FIG. 13, the shaft head 188 and shaft 180 will be rotated in a counterclockwise direction due to the movement of the conductor holder toward the cam rail end 194, and this action will rotate crank pin 184 in a counterclockwise direction causing the spring retainer 166 to pivot in a counterclockwise direction about pivot pin 176 from the full line position of FIG. 13 to the dotted line position. Continued movement of the conductor holder 138 toward the cam rail 148 causes the operating pin 190 to ride across the top surface 196 of the cam rail 148 holding the retainer 166 in its maximum inverted position as shown in dotted lines in FIG. 13. Of course, such counterclockwise rotation of the shaft head 188 is against the biasing force of the torsion spring 192, and the torsion spring will maintain the engagement of the pin 90 with the cam rail surface 196.

In operation, the spliced electrical conductors, not shown, will be loaded between the coils of the springs 172 of opposed conductor holders 138 in a manner identical to that described above with respect to the apparatus of FIGS. 1–11. As the conductor holders 138 approach the reservoir 140, the cam followers 154 will engage the cam rails 146 tilting the conductor holders toward the reservoir 140 about the pivot pins 156 to dip the conductors splice into the material within reservoir 140 in a manner identical to that described above. As shown in FIG. 14, the conductor holders at location B are tilted inwardly to immerse the splice within the encapsulation material located in reservoir 140.

As the conductor holders 138 continue to move toward the left, FIG. 14, the cam rails 146 shift the cam followers 154 inwardly to return the cam followers to the normal position. Thereupon, the operating pins 190 will engage the cam rail front edges 194 and the retainers 166 will now pivot forwardly to the dotted line position shown in FIG. 13. This operation occurs at the location B, FIG. 14, immediately after the conductor holders have left the region of the reservoir 140 and are located above the cooling conduit 150. As the rotation of the retainers 166 forwardly to the dotted line position substantially inverts the conductors and the encapsulation mass, any drippings or strings occurring from the removal of the encapsulation mass from the reservoir are wrapped about the splice, and this inversion of the encapsulation mass permits the material to further penetrate the interstices of the splice improving the fluid tightness thereof. Further, the inversion of the encapsulation mass above the cooling conduit 150 to expose the "top" of the encapsulation splice mass to cooling air emitting from the slots 152 aids in cooling the opposite side of the encapsulation mass as compared to the side of the mass exposed to the cooling air after the conductors pass the locations B.

The trailing ends of the cam rails 148 are represented at 198, and upon the pins 190 passing over the rail ends 198, the torsion springs 192 will rotate the shaft 180 in a clockwise direction to return the retainer 166 from the dotted line position of FIG. 13 to the full line position. Preferably, the top end regions of the cam rails 148 adjacent the ends 198 gradually slope downwardly to prevent an unduly abrupt pivoting return of the retainers 166. As the conductor holders 138 continue toward the left, FIG. 14, the "underside" of the encapsulation mass will be exposed to the cooling air emitting from slots 152 and the opposite side of the mass will now be cooled. By the time that the conductors reach the left end of the frame 124 the encapsulation mass is substantially hardened and cooled, and the conductors may be stripped from between the coils of the springs 172.

Figure 15:
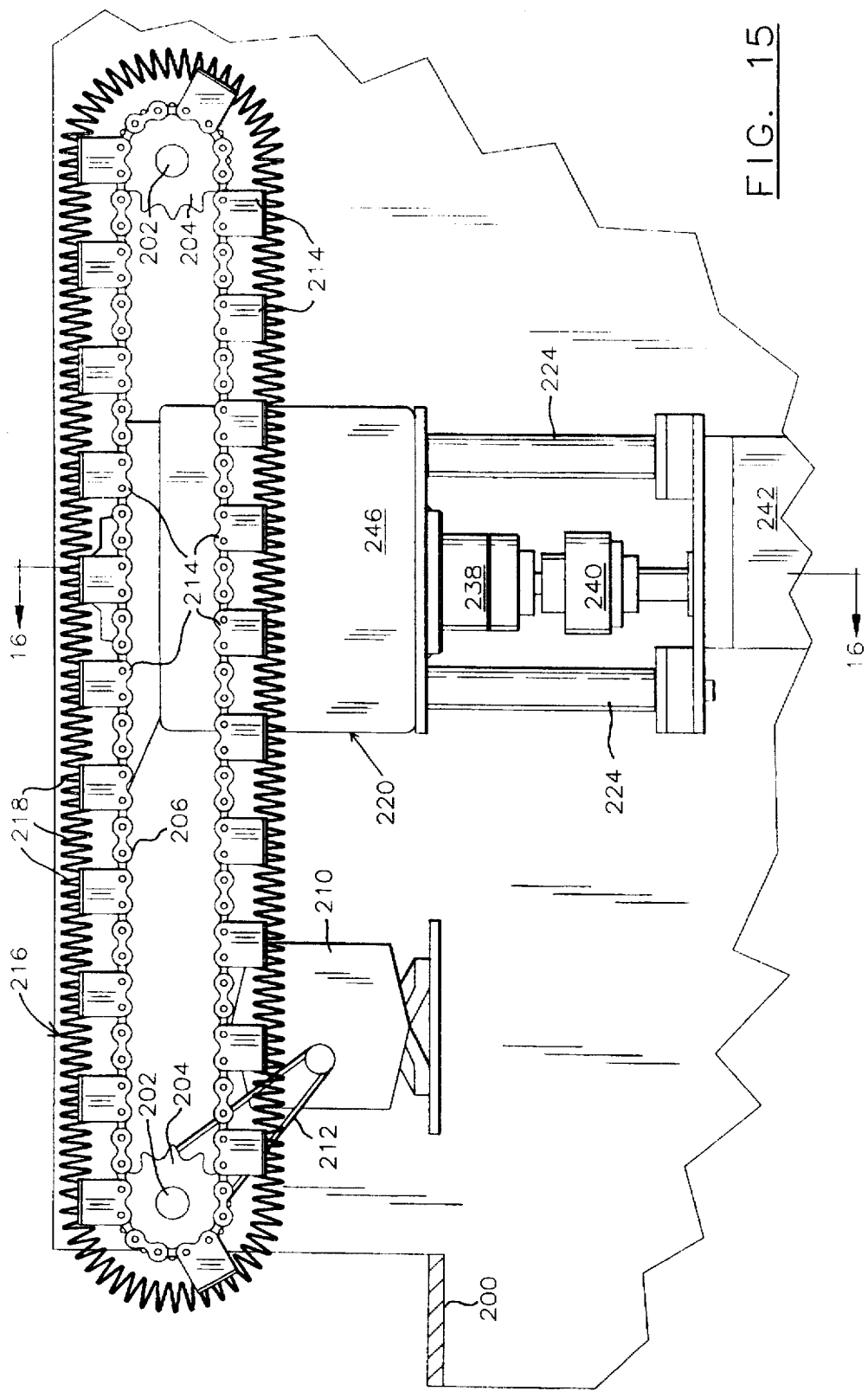
FIG. 15 is a side elevational view of another embodiment of the invention utilizing a continuous coil spring conveyor and sealant pump.
Figure 16:
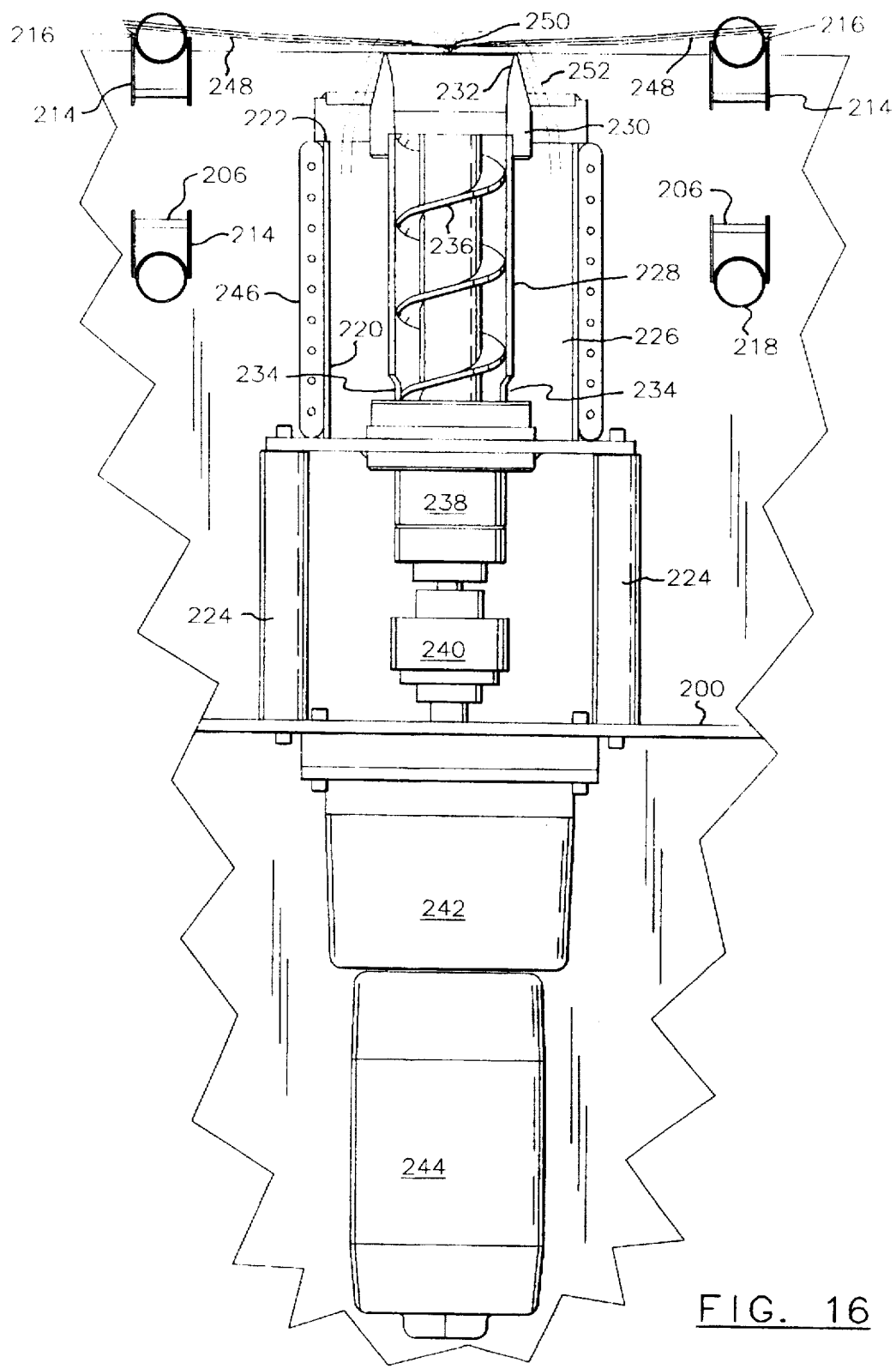
FIG. 16 is an elevational view, partially in section, of the embodiment shown in FIG. 15 along Section 16—16 through the sealant reservoir pump apparatus.

Yet another embodiment of apparatus practicing the inventive concepts of the invention is shown in FIGS. 15 and 16. As will be appreciated, the basic concepts of the invention with respect to exposing a conductor splice to a hot liquid thermoplastic sealant for encapsulation purposes is the same as previously described, but the apparatus for holding the conductors during coating, and exposing the conductors and splice to the sealant differ. In other respects, the apparatus shown in FIGS. 15 and 16 is substantially similar to that previously illustrated and described.

As apparent in FIG. 15, the frame 200 supports a pair of rotatable shafts 202 mounted upon suitable bearings, and the shafts support sprockets 204, which in turn support and drive the chain 206. A pair of spaced chains 206 are mounted upon the frame 202, as will be appreciated from FIG. 16, upon opposite sides of a sealant reservoir. Rotation of the sprockets 204 is produced by the electric motor 210 connected to the left sprocket, FIG. 15, by a belt 212.

A plurality of spaced conveyor spring holders 214 are mounted upon the chains 206, and the holders 214 support an endless conveyor spring 216. As previously described, the coils 218 of the spring 216 are spaced apart a distance which permits electrical conductors to be firmly wedged therebetween during the coating process, but in this embodiment the fact that the conveyors consist of endless coil springs simplifies loading of the conductors on the conveyor, and yet the availability of a plurality of coils permits the conductors to be spaced apart permitting penetration of the sealant into the splice.

The conveyor chains 206 are located upon opposite sides of a reservoir 220, FIG. 16, having an open top 222. The reservoir 220 is mounted upon columns 224 and defines a chamber 226 confining the thermoplastic liquid sealant. A tube 228 is located within the chamber 226 and includes a head 230 at its upper end which forms a fountain outlet at 232 at a vertical level substantially equal to the vertical location of the upper portion of the conveyor springs 216. At its lower end, the tube 228 is provided with inlet openings 234 which communicate with the chamber 226.

An Archimedes' screw or auger 236 is located within the tube 228 and is rotatably supported upon bearings 238, and the screw 236 is driven through a coupling 240 and a transmission 242 by the electric motor 244. The reservoir chamber 226 is heated by a heater 246 surrounding the reservoir, and the heater will maintain the sealant within the chamber 226 in a liquid form.

In operation, the operator will place the conductors 248 between the coils 218 of the conveyor springs 216 such that the splice 250, FIG. 16, will be in line with the fountain outlet 232. Accordingly, as shown in FIG. 16, the splice 250 will pass through the upwardly flowing stream of sealant as represented at 252, and the coating of the splice 250, and the adjacent exposed conductors, takes place in the flowing stream 252 wherein the sealant is forced upwardly through the splice and around the splice region and through the conductor interstices to perform an effective sealing of the conductors and splice.

In the embodiment of FIGS. 15 and 16, a high production can be maintained in view of the ease of loading of the conveyor springs 216 with the conductors 248, and the upwardly flowing of the sealant as provided by the stream 252 forms a very effective sealing of the splice and adjacent conductors without bending or otherwise mechanically flexing the conductor and splice.

It is appreciated that various modifications to the disclosed embodiments of the invention may be apparent to those skilled in the art without departing from the spirit and scope of the invention.

I claim:

1. The method of encapsulating the exposed splice of three or more flexible substantially axially aligned elongated electrical conductors with a sealant, each conductor having an insulating cover wherein at least two of the conductors are in adjacent relationship to each other and at least a third conductor extends in the substantially opposite direction from the splice with respect to the two adjacent conductors comprising the steps of:

(a) holding the conductors on opposite sides of the splice at spaced locations from the splice to define a span wherein the splice is substantially centrally located within said span and such that adjacent conductors are slightly separated to facilitate the entry of sealant between adjacent conductors at the splice, (b) bending the conductors downwardly at said spaced locations to substantially form said span into a U configuration with the splice substantially located at the lowermost portion of the span configuration, (c) immersing said U configuration span into a molten dielectric thermoplastic sealant of low viscosity to a sufficient depth to submerge the splice and predetermined lengths of the conductors on opposite sides of the splice in the sealant to circumferentially coat the splice and submerged conductor portions with the sealant to define a splice encapsulation mass, (d) projecting sealant substantially parallel to the adjacent conductors and toward the immersed splice to force sealant between adjacent conductors at the splice, (e) bending the conductors upwardly at said spaced locations and removing the immersed conductors and splice encapsulation mass from the molten sealant, (f) translating the conductors laterally with respect to their length during the steps of bending the conductors to form a U-configuration and during immersion of said U-configuration span and during the removing of the immersed conductors from the molten sealant, (g) releasing the conductors at said spaced locations, and (h) drying the splice encapsulation mass to form an electrically insulated jacket about the splice and the portion of the conductors adjacent the splice.

2. The method of encapsulating an exposed splice as in claim 1 wherein the step of projecting the sealant substantially parallel to the adjacent conductors and toward the immersed splice comprises mechanically agitating the molten sealant on opposite sides of the splice to force molten sealant toward the splice and intermediate adjacent immersed conductors.

3. The method of encapsulating an exposed splice as in claim 1 including the step of inverting the conductors and encapsulation mass immediately subsequent to removing the conductors and splice encapsulation mass from the molten sealant.

4. Apparatus for producing a electrical insulating encapsulation by a molten dielectric sealant about an exposed splice of flexible substantially axially aligned conductors which extend in substantially opposite directions from the splice comprising, in combination, a frame, an elongated open sealant reservoir having first and second sides, a center portion intermediate said sides, and ends mounted on said frame, heating means operatively associated with said reservoir for heating said reservoir to maintain a hot melt thermoplastic sealant therein in a liquid molten state, immersed sealant projection means located within said reservoir projecting sealant toward said reservoir center region, first and second elongated conveyors mounted on said frame located adjacent said first and second reservoir sides, respectively, having an operative direction of movement substantially parallel to the length of said reservoir, aligned pairs of conductor holding means mounted on said conveyors, each pair of conductor holding means adapted to support a spliced set of conductors whereby the holding means engage the spliced conductors on opposite sides of the splice to define a conductor span bridging associated holding means and locating the splice above and in alignment with said sealant reservoir, displacement means selectively displacing an aligned pair of conductor holding means toward and away from each other during operative movement of said conveyors, said displacement means displacing aligned pairs of holding means toward each other when the conductor span is aligned above said sealant reservoir causing the span to define a U configuration immersing the lowermost portion of the span and the splice into said molten sealant, said sealant projection means projecting molten sealant toward the lowermost portion of the span and splice to cause the sealant to enter small interstices between the conductors adjacent the splice, said displacement means subsequently displacing aligned pairs of holding means away from each other to raise said span and the splice from and above the sealant reservoir, and motor means drivingly connected to said conveyors.

5. In apparatus for producing an electrical insulating encapsulation as in claim 4, said projection means located within said reservoir comprising a pair of elongated paddles rotatably mounted within said reservoir, said paddles having axes of rotation substantially parallel to the operative direction of conveyor movement and located on opposite sides of said reservoir center portion, and a motor drivingly connected to said paddles.

6. In apparatus for producing an electrical insulating encapsulation as in claim 5, said conductor holding means each including a coil compression spring having laterally accessible coils and a longitudinal axis substantially parallel to the direction of movement of the associated conveyor, adjacent coils being spaced apart a distance less than the outer diameter of the conductors whereby the lateral insertion of a conductor between adjacent spring coils causes the coils to frictionally grip the conductor therebetween.

7. In apparatus for producing an electrical insulating encapsulation as in claim 6, spring compression adjustment means mounted upon said conductor holding means selectively adjusting the length of the associated compression spring to vary the spacing between adjacent spring coils and the frictional force imposed upon a conductor by the engaging adjacent coils.

8. In apparatus for producing an electrical insulating encapsulation as in claim 5, pivot pins mounting said conductor holding means upon the associated conveyors, said pivot pins each having a pivot axis substantially parallel to the direction of movement of the associated conveyor, said displacement means selectively pivoting said conductor holding means about its pivot pin to displace the conductor holding means of a pair toward and away from each other.

9. In apparatus for producing an electrical insulating encapsulation as in claim 8, said displacement means including a cam fixed on said frame and a cam follower mounted on the associated conductor holding means engaging said fixed cam.

10. In apparatus for producing an electrical insulating encapsulation as in claim 9, a gear defined on each of said conductor holding means concentric with the associated pivot pin axis, a slidable gear rack meshing with each of said gears, said cam followers being connected to said racks whereby displacement of said cam followers by said cam causes said racks to rotate the associated gear and conductor holding means.

* * * * *